(12) United States Patent
Falana et al.

(10) Patent No.: US 8,524,639 B2
(45) Date of Patent: Sep. 3, 2013

(54) COMPLEMENTARY SURFACTANT COMPOSITIONS AND METHODS FOR MAKING AND USING SAME

(75) Inventors: Olusegun Matthew Falana, San Antonio, TX (US); Edward C. Marshall, Schertz, TX (US); Frank Zamora, San Antonio, TX (US)

(73) Assignee: Clearwater International LLC, Houston, TX (US)

( * ) Notice: Subject to any disclaimer, the term of this patent is extended or adjusted under 35 U.S.C. 154(b) by 182 days.

(21) Appl. No.: 12/885,062

(22) Filed: Sep. 17, 2010

(65) Prior Publication Data

US 2012/0071366 A1 Mar. 22, 2012

(51) Int. Cl.
*C09K 8/60* (2006.01)
*C09K 8/05* (2006.01)
*C09K 8/68* (2006.01)
*B01F 17/00* (2006.01)
*E21B 43/26* (2006.01)

(52) U.S. Cl.
USPC .......... 507/202; 507/100; 507/127; 507/200; 507/233; 166/308.6

(58) Field of Classification Search
USPC ....... 507/100, 200, 936, 127, 233; 166/308.6
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |

(Continued)

FOREIGN PATENT DOCUMENTS

| | | |
|---|---|---|
| CA | 2125513 | 1/1995 |
| DE | 4027300 | 5/1992 |

(Continued)

OTHER PUBLICATIONS

Technical datasheet of APFS-16 of Applied Polymers, Jun. 2010.*

(Continued)

*Primary Examiner* — Ling-siu Choi
*Assistant Examiner* — Aiqun Li
(74) *Attorney, Agent, or Firm* — Robert W Strozier

(57) ABSTRACT

Complementary surfactant systems and downhole fluids made using the systems are disclosed along with methods for making and using same, where the surfactant systems include from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system is tailored to foam the fluid including the analyzed crude and/or condensate.

14 Claims, 1 Drawing Sheet

(56) References Cited

U.S. PATENT DOCUMENTS

| | | | | |
|---|---|---|---|---|
| 3,965,982 A | 6/1976 | Medlin ........................ 166/249 |
| 3,990,978 A | 11/1976 | Hill ............................. 507/235 |
| 4,007,792 A | 2/1977 | Meister .................... 166/308.2 |
| 4,052,159 A | 10/1977 | Fuerst et al. |
| 4,067,389 A | 1/1978 | Savins ........................ 166/246 |
| 4,108,782 A | 8/1978 | Thompson .................. 507/205 |
| 4,112,050 A | 9/1978 | Sartori et al. ................ 423/223 |
| 4,112,051 A | 9/1978 | Sartori et al. ................ 423/223 |
| 4,112,052 A | 9/1978 | Sartori et al. ................ 423/223 |
| 4,113,631 A | 9/1978 | Thompson .................. 507/202 |
| 4,378,845 A | 4/1983 | Medlin et al. ............... 166/297 |
| 4,461,716 A | 7/1984 | Barbarin et al. ............. 252/307 |
| 4,479,041 A | 10/1984 | Fenwick et al. ............ 200/81 R |
| 4,506,734 A | 3/1985 | Nolte ........................ 166/308.1 |
| 4,514,309 A | 4/1985 | Wadhwa .................... 507/211 |
| 4,541,935 A | 9/1985 | Constien et al. ............. 507/225 |
| 4,549,608 A | 10/1985 | Stowe et al. .............. 166/280.1 |
| 4,561,985 A | 12/1985 | Glass, Jr. .................... 507/108 |
| 4,565,647 A * | 1/1986 | Llenado ...................... 516/14 |
| 4,623,021 A | 11/1986 | Stowe ...................... 166/250.1 |
| 4,654,266 A | 3/1987 | Kachnik .................... 428/403 |
| 4,657,081 A | 4/1987 | Hodge ...................... 166/380.5 |
| 4,660,643 A | 4/1987 | Perkins ...................... 166/283 |
| 4,683,068 A | 7/1987 | Kucera ...................... 507/201 |
| 4,686,052 A | 8/1987 | Baranet et al. ............... 507/244 |
| 4,695,389 A | 9/1987 | Kubala ...................... 507/244 |
| 4,705,113 A | 11/1987 | Perkins ...................... 166/302 |
| 4,714,115 A | 12/1987 | Uhri ........................ 166/308.1 |
| 4,718,490 A | 1/1988 | Uhri ........................... 166/281 |
| 4,724,905 A | 2/1988 | Uhri ........................ 166/250.1 |
| 4,725,372 A | 2/1988 | Teot et al. ................... 507/129 |
| 4,739,834 A | 4/1988 | Peiffer et al. .............. 166/308.4 |
| 4,741,401 A | 5/1988 | Walles et al. ................ 166/300 |
| 4,748,011 A | 5/1988 | Baize .......................... 423/228 |
| 4,779,680 A | 10/1988 | Sydansk .................... 166/300 |
| 4,795,574 A | 1/1989 | Syrinek et al. .............. 507/238 |
| 4,817,717 A | 4/1989 | Jennings, Jr. et al. ........ 166/278 |
| 4,830,106 A | 5/1989 | Uhri ........................ 166/250.1 |
| 4,846,277 A | 7/1989 | Khalil et al. .............. 166/280.1 |
| 4,848,468 A | 7/1989 | Hazlett et al. ............... 166/300 |
| 4,852,650 A | 8/1989 | Jennings, Jr. et al. ...... 166/250.1 |
| 4,869,322 A | 9/1989 | Vogt, Jr. et al. ........... 166/280.1 |
| 4,892,147 A | 1/1990 | Jennings, Jr. et al. ...... 166/280.2 |
| 4,926,940 A | 5/1990 | Stromswold ................ 166/247 |
| 4,938,286 A | 7/1990 | Jennings, Jr. ............. 166/280.1 |
| 4,978,512 A | 12/1990 | Dillon ........................ 423/226 |
| 5,005,645 A | 4/1991 | Jennings, Jr. et al. ...... 166/280.1 |
| 5,024,276 A | 6/1991 | Borchardt ................. 166/308.6 |
| 5,067,556 A | 11/1991 | Fudono et al. ............. 62/196.4 |
| 5,074,359 A | 12/1991 | Schmidt ................... 166/280.1 |
| 5,074,991 A | 12/1991 | Weers ......................... 208/236 |
| 5,082,579 A | 1/1992 | Dawson ...................... 507/211 |
| 5,106,518 A | 4/1992 | Cooney et al. ................ 507/21 |
| 5,110,486 A | 5/1992 | Manalastas et al. .......... 507/260 |
| 5,169,411 A | 12/1992 | Weers ........................... 44/421 |
| 5,224,546 A | 7/1993 | Smith et al. ................. 166/300 |
| 5,228,510 A | 7/1993 | Jennings, Jr. et al. ........ 166/263 |
| 5,246,072 A * | 9/1993 | Frazier et al. .............. 166/270.1 |
| 5,246,073 A | 9/1993 | Sandiford et al. ........... 166/295 |
| 5,259,455 A | 11/1993 | Nimerick et al. .......... 166/308.5 |
| 5,330,005 A | 7/1994 | Card et al. ................ 166/280.2 |
| 5,342,530 A | 8/1994 | Aften et al. ................ 252/8.551 |
| 5,347,004 A | 9/1994 | Rivers et al. ................ 544/180 |
| 5,363,919 A | 11/1994 | Jennings, Jr. ............. 166/308.1 |
| 5,402,846 A | 4/1995 | Jennings, Jr. et al. ........ 166/259 |
| 5,411,091 A | 5/1995 | Jennings, Jr. ............. 166/280.1 |
| 5,424,284 A | 6/1995 | Patel et al. ................... 507/129 |
| 5,439,055 A | 8/1995 | Card et al. ................ 166/280.2 |
| 5,462,721 A | 10/1995 | Pounds et al. ............... 423/226 |
| 5,465,792 A | 11/1995 | Dawson et al. ............. 166/295 |
| 5,472,049 A | 12/1995 | Chaffe et al. ............. 166/250.1 |
| 5,482,116 A | 1/1996 | El-Rabaa et al. .......... 166/250.1 |
| 5,488,083 A | 1/1996 | Kinsey, III et al. ........... 507/211 |
| 5,497,831 A | 3/1996 | Hainey et al. ............. 166/308.1 |
| 5,501,275 A | 3/1996 | Card et al. ................ 166/280.2 |
| 5,551,516 A | 9/1996 | Norman et al. ............ 166/308.2 |
| 5,624,886 A | 4/1997 | Dawson et al. ............... 507/217 |
| 5,635,458 A | 6/1997 | Lee et al. .................... 507/240 |
| 5,649,596 A | 7/1997 | Jones et al. .................. 166/300 |
| 5,669,447 A | 9/1997 | Walker et al. ................ 166/300 |
| 5,674,377 A | 10/1997 | Sullivan, III et al. ...... 208/208 R |
| 5,688,478 A | 11/1997 | Pounds et al. ............... 423/228 |
| 5,693,837 A | 12/1997 | Smith et al. .................. 556/148 |
| 5,711,396 A | 1/1998 | Joerg et al. ................... 180/444 |
| 5,722,490 A | 3/1998 | Ebinger ....................... 166/281 |
| 5,744,024 A | 4/1998 | Sullivan, III et al. ......... 208/236 |
| 5,755,286 A | 5/1998 | Ebinger ....................... 166/281 |
| 5,775,425 A | 7/1998 | Weaver et al. .............. 166/276 |
| 5,787,986 A | 8/1998 | Weaver et al. ............ 166/280.2 |
| 5,806,597 A | 9/1998 | Tjon-Joe-Pin et al. ....... 166/300 |
| 5,807,812 A | 9/1998 | Smith et al. .................. 507/238 |
| 5,833,000 A | 11/1998 | Weaver et al. .............. 166/276 |
| 5,853,048 A | 12/1998 | Weaver et al. .............. 166/279 |
| 5,871,049 A | 2/1999 | Weaver et al. .............. 166/276 |
| 5,877,127 A | 3/1999 | Card et al. ................... 507/273 |
| 5,908,073 A | 6/1999 | Nguyen et al. .............. 166/276 |
| 5,908,814 A | 6/1999 | Patel et al. .................... 507/131 |
| 5,964,295 A | 10/1999 | Brown et al. .............. 166/308.2 |
| 5,979,557 A | 11/1999 | Card et al. ................... 166/300 |
| 5,980,845 A | 11/1999 | Cherry ......................... 423/229 |
| 6,016,871 A | 1/2000 | Burts, Jr. ..................... 166/300 |
| 6,035,936 A | 3/2000 | Whalen .................... 166/308.5 |
| 6,047,772 A | 4/2000 | Weaver et al. .............. 166/276 |
| 6,054,417 A | 4/2000 | Graham et al. ............... 507/238 |
| 6,059,034 A | 5/2000 | Rickards et al. ........... 166/280.2 |
| 6,060,436 A | 5/2000 | Snyder et al. ................ 507/266 |
| 6,069,118 A | 5/2000 | Hinkel et al. ................. 507/277 |
| 6,123,394 A | 9/2000 | Jeffrey ........................... 299/16 |
| 6,133,205 A | 10/2000 | Jones ........................... 507/276 |
| 6,147,034 A | 11/2000 | Jones et al. ................... 507/238 |
| 6,162,449 A | 12/2000 | Maier et al. .................. 424/401 |
| 6,162,766 A | 12/2000 | Muir et al. .................... 507/267 |
| 6,169,058 B1 | 1/2001 | Le et al. ....................... 507/222 |
| 6,228,812 B1 | 5/2001 | Dawson et al. ............... 507/221 |
| 6,247,543 B1 | 6/2001 | Patel et al. ..................... 175/64 |
| 6,267,938 B1 | 7/2001 | Warrender et al. ........... 423/226 |
| 6,283,212 B1 | 9/2001 | Hinkel et al. ................. 166/279 |
| 6,291,405 B1 | 9/2001 | Lee et al. ..................... 507/136 |
| 6,330,916 B1 | 12/2001 | Rickards et al. ........... 166/280.2 |
| 6,725,931 B2 | 4/2004 | Nguyen et al. ............ 166/280.2 |
| 6,756,345 B2 | 6/2004 | Pakulski et al. .............. 507/246 |
| 6,793,018 B2 | 9/2004 | Dawson et al. ............... 166/300 |
| 6,832,650 B2 | 12/2004 | Nguyen et al. ............... 166/279 |
| 6,875,728 B2 | 4/2005 | Gupta et al. .................. 507/240 |
| 7,140,433 B2 | 11/2006 | Gatlin et al. ............. 166/250.01 |
| 7,268,100 B2 | 9/2007 | Kippie et al. ................. 507/244 |
| 7,350,579 B2 | 4/2008 | Gatlin et al. ............... 166/308.3 |
| 7,392,847 B2 | 7/2008 | Gatlin et al. ............... 166/280.2 |
| 7,517,447 B2 | 4/2009 | Gatlin ......................... 208/236 |
| 7,565,933 B2 | 7/2009 | Kippie et al. |
| 7,566,686 B2 | 7/2009 | Kippie et al. ................. 507/213 |
| 7,712,535 B2 | 5/2010 | Venditto et al. |
| 7,767,628 B2 | 8/2010 | Kippie et al. ................. 507/102 |
| 2002/0049256 A1 | 4/2002 | Bergeron, Jr. ................ 514/674 |
| 2002/0165308 A1 | 11/2002 | Kinniard et al. .............. 524/492 |
| 2003/0008781 A1* | 1/2003 | Gupta et al. .................. 507/240 |
| 2003/0220204 A1 | 11/2003 | Baran, Jr. et al. ............. 507/200 |
| 2005/0045330 A1 | 3/2005 | Nguyen et al. ............... 166/281 |
| 2005/0092489 A1 | 5/2005 | Welton et al. ............. 166/280.2 |
| 2005/0137114 A1 | 6/2005 | Gatlin et al. .................. 510/424 |
| 2005/0250666 A1 | 11/2005 | Gatlin et al. .................. 510/492 |
| 2006/0194700 A1 | 8/2006 | Gatlin et al. .................. 507/203 |
| 2007/0032693 A1 | 2/2007 | Gatlin et al. .................. 507/239 |
| 2007/0129257 A1* | 6/2007 | Kippie et al. ................. 507/102 |
| 2007/0173413 A1 | 7/2007 | Lukocs et al. ................ 507/238 |
| 2007/0173414 A1 | 7/2007 | Wilson, Jr. .................... 507/131 |
| 2008/0197085 A1 | 8/2008 | Wanner et al. |
| 2008/0251252 A1 | 10/2008 | Schwartz |
| 2008/0257553 A1 | 10/2008 | Gatlin et al. ............... 166/280.2 |
| 2008/0257554 A1 | 10/2008 | Zamora et al. |
| 2008/0269082 A1 | 10/2008 | Wilson, Jr. et al. |
| 2008/0283242 A1 | 11/2008 | Ekstrand et al. |
| 2008/0287325 A1 | 11/2008 | Thompson et al. |

| | | | |
|---|---|---|---|
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2009/0275488 A1 | 11/2009 | Zamora et al. | |
| 2010/0000795 A1 | 1/2010 | Kakadjian et al. | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0212905 A1 | 8/2010 | van Petegen | |
| 2010/0252262 A1 | 10/2010 | Ekstrand et al. | |

FOREIGN PATENT DOCUMENTS

| | | | |
|---|---|---|---|
| GB | 775376 | | 10/1954 |
| GB | 1073338 | A | 6/1967 |
| JP | 10001461 | | 6/1988 |
| JP | 08151422 | | 11/1996 |
| JP | 10110115 | A | 4/1998 |
| JP | 2005194148 | A | 7/2005 |
| WO | WO 98/56497 | | 12/1998 |

OTHER PUBLICATIONS

U.S. Appl. No. 12/750,335, filed Mar. 30, 2010, Parker.
U.S. Appl. No. 12/473,805, filed Mar. 28, 2009, Falana et al.
U.S. Appl. No. 12/510,101, filed Jul. 27, 2009, Falana et al.
U.S. Appl. No. 12/479,486, filed Jun. 5, 2009, Kakadjian et al.
U.S. Appl. No. 12/465,437, filed May 13, 2009, Kakadjian.
U.S. Appl. No. 12/497,399, filed Jul. 7, 2009, Falana et al.
U.S. Appl. No. 12/784,479, filed May 20, 2010, Zamora et al.
U.S. Appl. No. 12/832,222, filed Jul. 8, 2010, van Petegen.
U.S. Appl. No. 12/758,466, filed Apr. 12, 2010, Thompson et al.

* cited by examiner

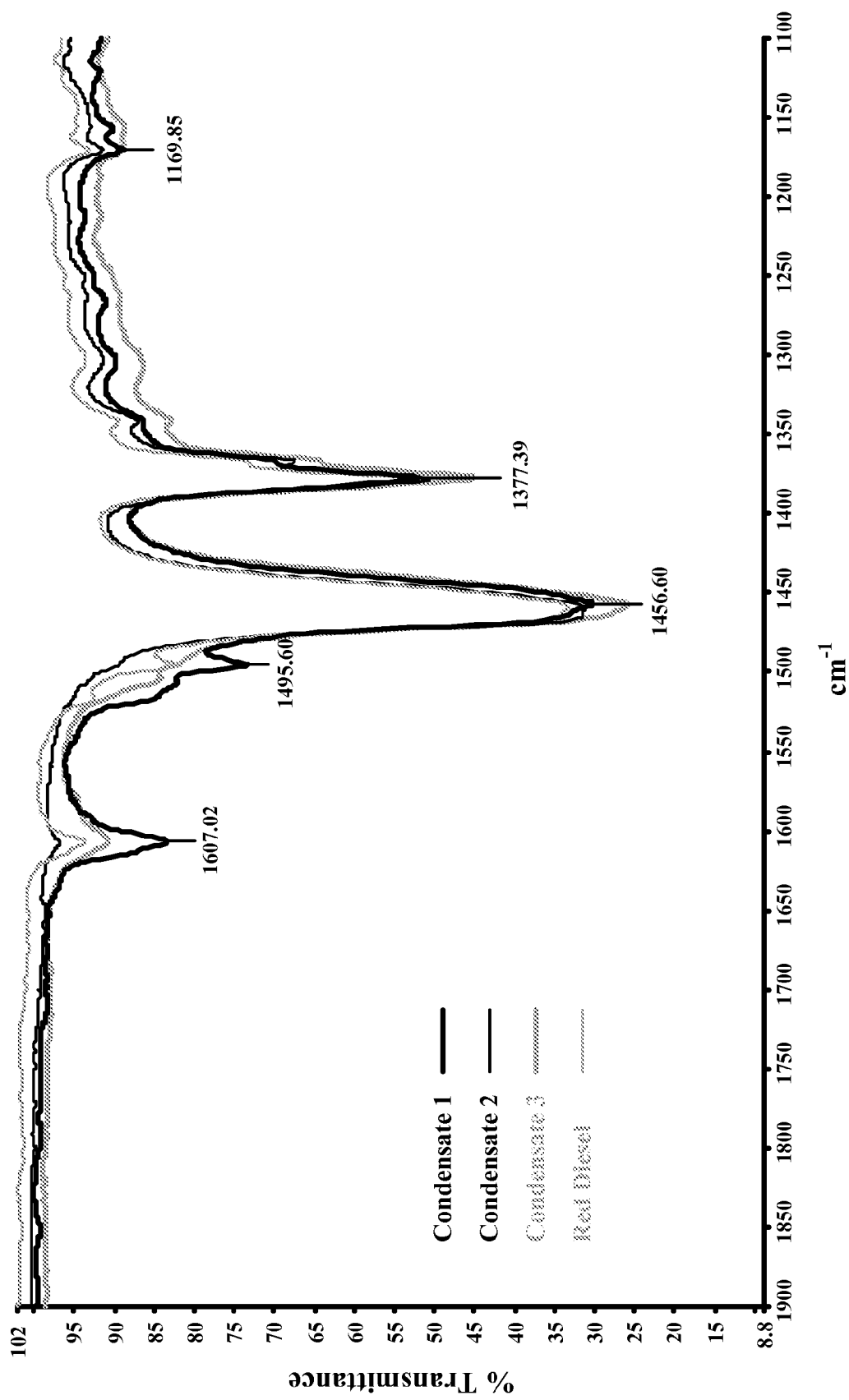

COMPLEMENTARY SURFACTANT COMPOSITIONS AND METHODS FOR MAKING AND USING SAME

BACKGROUND OF THE INVENTION

1. Field of the Invention

Embodiments of the present invention relate to complementary surfactant systems for use in drilling operations and to methods for making and using same.

More particularly, embodiments of the present invention relate to complementary surfactant systems for use in drilling operations and to methods for making and using same, where the systems include a surfactant subsystem and an optional solvent subsystem, where the surfactant subsystem includes a fluorinated surfactant and a silicon surfactant, where the systems is tunable to a particular producing formation to achieve a desirable foam height and foam half life in drilling, producing and stimulating operations.

2. Description of the Related Art

There is paucity of oil compatible surfactants possessing desirable foam properties for multipurpose mining operations like drilling, and crude and especially condensate removal.

Oil-based or so called hydrocarbon surfactants are of two categories: silicone based surfactants and fluorocarbon based surfactants. While use of the fluorocarbon surfactants have been limited to mining operations like fracturing and maybe condensate removal as disclosed in U.S. Pat. Nos. 4,796,702; 4,836,281; and 4,404,112), silicone surfactants have been demonstrated lately by Falana, et. al. in US Publication No. 2010-0000795 A1 to be suitable for formulations used in underbalanced drilling. Yet, use of the surfactants in removing condensates is characterized by unexplained inconsistencies in compatibility or the lack thereof from one condensate to another. Hitherto, in the US, fluorocarbon surfactants are known environmental toxins, while silicone based surfactants are known to be made up in solvents that are cancer suspects or environmentally non-benign such as alkyl benzenes. Furthermore, blend of polyglycosides and amphoteric surfactants have been used to unload less than 100% condensates as described in US 2007/0181307 A1.

Thus, there is a need in the art for surfactant systems for use in drilling, producing and stimulating operations, which is tunable to a producing formation so that a desired foam height and half life may be achieved.

SUMMARY OF THE INVENTION

Embodiments of the present invention provide surfactant compositions including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the compositions are tailored to foam a fluid including a spectroscopically analyzed crude and/or condensate present in a producing formation.

Embodiments of the present invention provide drilling fluid compositions including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the systems are tailored to foam the drilling fluid compositions including a spectroscopically analyzed crude and/or condensate present in a producing formation.

Embodiments of the present invention provide completion fluid composition comprising a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the systems are tailored to foam the completion fluid compositions including a spectroscopically analyzed crude and/or condensate present in a producing formation.

Embodiments of the present invention provide fracturing fluid composition comprising a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system are tailored to foam the fracturing fluid compositions including a spectroscopically analyzed crude and/or condensate present in a producing formation.

Embodiments of the present invention provide stimulating fluid composition comprising a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system are tailored to foam the stimulating fluid compositions including a spectroscopically analyzed crude and/or condensate present in a producing formation.

Embodiments of the present invention provide methods for foaming a fluid including a crude and/or condensate including analyzing a crude and/or a condensate from a producing formation. The methods also include preparing a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system is tailored to foam the fluid including the analyzed crude and/or condensate. The methods also include adding an effective amount of the surfactant system to a downhole fluid, where the effective amount is sufficient to form a stable foam upon addition of a gas. The methods also include adding a foaming amount of a gas to the downhole fluid sufficient to convert the fluid into a stable foam.

For drilling fluids, the embodiments of the methods of this invention further include pumping the drilling fluid into a borehole during drilling through a drill bit, where the fluid includes a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system is tailored to foam the fluid including the analyzed crude and/or condensate, and injecting an effective amount of a gas to foam the drilling fluid producing a stable drilling fluid foam.

For fracturing fluids, the embodiments of the methods of this invention further include pumping a fracturing fluid into a producing formation under condition to produce fractures in the formation in the presence or absence of a proppant, where the fluid includes a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, and where the system is tailored to foam the fluid including the analyzed crude and/or condensate.

For lift fluids, the embodiments of the methods of this invention further include pumping a foaming effective amount of a gas and a lifting fluid into a completed and producing formation to produce a stable lifting foam reducing column weight and improving production, where the lifting fluid includes an effective amount of a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system is tailored to foam the fluid including the analyzed crude and/or condensate.

For stimulating fluids, the embodiments of the methods of this invention further include pumping a foaming effective amount of a gas and a stimulating fluid into a completed and producing formation to produce a stable foam under conditions of heat and pressure sufficient to force the foam into the formation to improve production, where the lifting fluid includes an effective amount of a surfactant system including from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems, where the system is tailored to foam the fluid including the analyzed crude and/or condensate.

Embodiments of the methods of this invention a method for drilling an oil and/or gas well including the steps of providing an oil-based foam drilling fluid of this invention. The method also includes the step of drilling an oil and/or gas well using the drilling fluid. The method also includes adding or injection an amount of a nitrogen-containing gas sufficient to produce a stable foam so that a pressure of the fluid is less than or substantially equal to a fluid pressure of the formation into to which drilling is proceeding.

BRIEF DESCRIPTION OF THE DRAWINGS

The invention can be better understood with reference to the following detailed description together with the appended illustrative drawings in which like elements are numbered the same:

FIG. 1 depicts overlapping FT-IR spectra of aromatic and non-aromatic condensates relative to Red Diesel.

DEFINITIONS OF TERM USED IN THE INVENTION

The following definitions are provided in order to aid those skilled in the art in understanding the detailed description of the present invention.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "surfactant" refers to a soluble, or partially soluble compound that reduces the surface tension of liquids, or reduces interfacial tension between two liquids, or a liquid and a solid by congregating and orienting itself at these interfaces.

The term "drilling fluids" refers to any fluid that is used during well drilling operations including oil and/or gas wells, geo-thermal wells, water wells or other similar wellbs.

The term "completion fluids" refers to any fluid that is used in oil and/or gas well completion operations.

The term "production fluids" refers to any fluid that is used in oil and/or gas well production operations.

An under-balanced and/or managed pressure drilling fluid means a drilling fluid having a circulating hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydrostatic pressure less than or equal to 9.6 lbm/gal. Most under-balanced and/or managed pressure drilling fluids include at least a density reduction additive. Other additive many include a corrosion inhibitor, a pH modifier and a shale inhibitor.

The term "foamable" means a composition that when mixed with a gas forms a stable foam.

The term "gpt" means gallons per thousand gallons.

The term "ppt" means pounds per thousand gallons.

DETAILED DESCRIPTION OF THE INVENTION

The inventors have found that surfactant systems can be formulated for use in downhole operation involving producing formations, where the systems are tuned to have a desired workable foam height and half life for the nature of the fluids present in the producing formation. The systems include a fluorinated surfactant subsystem, a silicone surfactant subsystem and an optional solvent subsystem.

The inventors investigated surfactant activity to determine why surfactant activity varies depending on the nature of the fluid in a producing formation, e.g., differences between crude oil, condensate and/or other similar fluids present in a producing formation. Analysis of a number of condensates afforded evidence that such fluids are characteristically different. Condensates differ with respect to constituent such as aliphatics, aromatics, naphthalics, unsaturates, other fluid components, or mixtures and combinations thereof.

The inventors also noted that most fluorinated surfactants including polyfluorosurfactants may be formulated in non-environmentally persisting or non-hazardous constituents, where these surfactants may then be used to selectively foam a fluid containing 100% condensate. Moreover, silicone surfactants have also been found to foam similar fluids.

The inventors have found that mixtures of these two classes of surfactants may be formulated in environmentally benign systems, where the blends of the two surfactants offer synergistic properties.

The first surfactant subsystem includes one fluoroaliphatic polymeric ester (FAPE) surfactant or a plurality of fluoroaliphatic polymeric ester (FAPE) surfactants designated herein as FFS. In certain embodiments, the fluoroaliphatic polymeric ester (FAPE) surfactant has an average molecular weight of at least 1000,000 grams per mole. In other embodiments, the FAPE surfactant has an average molecular weight of at least 1000,000 grams per mole and is described in WO 2008/089391 A1 and WO 2008/089386 A2, available from 3-M Innovative Properties Company in Saint Paul Minn., USA. In certain embodiments, neat FAPE surfactant polymers may be used in the surfactant systems of this invention.

The second surfactant subsystem include a silicon surfactant or a plurality of silicon surfactants designated herein as FSS. In certain embodiment, a silicon surfactant sold under the tradename OleoFoam C™, available from Weatherford including a Dow Corning product. Unlike the FAPE surfactants of the first surfactant subsystem, the second surfactant subsystem have been used in foam systems for drilling as disclosed in US Publication No. 2010/0000795.

The solvent subsystems for use in the surfactant systems of this invention are green solvents designated herein as SS. Green solvents are non-toxic, biodegradable neat chemicals and/or mixtures of chemicals. For instance, HF1000™ is a biodegradable blend of paraffins, olefins, naphthenes, esters, and oxygenates. HF1000™ has a low viscosity, is a pale-yellow liquid, has a flashpoint of >80° C. (175° F.) and has a pour point of 19° F.

The surfactant composition of this invention include from 0 wt. % to 100 wt. % of a first surfactant (FFS) subsystem, from 100 wt. % to 0 wt. % of a second surfactant (FSS) subsystem, and from 0 wt. % to 100 wt. % of a solvent (SS) subsystem based on the wt. % of the surfactant subsystems. The compositions ranges and effective amount of the composition are tailored to foam a fluid including a spectroscopically analyzed crude and/or condensate present in a producing formation.

Spectroscopic Analysis of Producing Fluids

The present invention includes spectroscopically analyzing the production fluids to determine the makeup of the components in the production fluid. If the producing fluids include a high aromatic content similar to the aromatic content of Red Diesel, then the foaming system of this invention may comprise FSS surfactants in the presence or absence of the FFS surfactants and in the presence or absence of solvents of this invention. If the producing fluids include little or no aromatic content, then the foaming system of this invention may comprise FFS surfactants in the presence or absence of the FSS surfactants and in the presence or absence of solvents of this invention. In all other cases, the foaming system of this invention is a combination of FFS and FSS surfactants in the presence or absence of the solvents of this invention, where the amount of FFS and FSS surfactants are adjusted to the character of the condensates and/or crudes in the producing fluids—higher aromatic character, higher proportions of FSS surfactants; lower aromatic character, higher proportions FFS surfactants in the presence or absence of solvents of this invention.

Drilling Fluids

Generally, a drilling fluid is used during the drilling of a well. Drilling fluids can be designed for so-called over-balanced drilling (a hydrostatic pressure of the drilling fluid is higher than the pore pressure of the formation), under-balanced drilling (a hydrostatic pressure of the drilling fluid is lower than the pore pressure of the formation) or managed pressure drilling, where the hydrostatic pressure of the drilling fluid is managed depending on the nature of the material through which drilling is occurring. Each type of drilling uses different types of drilling fluids. The compositions of this invention are designed to improve dispersion and stability of the resulting drilling fluids so that cuttings remain suspended for longer periods of time or at temperatures up to 450° F.

Embodiments of the present invention relates to drilling fluid compositions including a surfactant system of this invention, where the surfactant system includes from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems. The compositions ranges and effective amount of the composition are tailored to foam a fluid including a spectroscopically analyzed crude and/or condensate present in a producing formation.

Completion Fluids

Embodiments of the present invention relates to completion fluid compositions including a surfactant system of this invention, where the surfactant system includes from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems. The compositions ranges and effective amount of the composition are tailored to foam a fluid including a spectroscopically analyzed crude and/or condensate present in a producing formation.

Fracturing Fluids

The present invention also relates to methods of fracturing a subterranean formation comprising forming a fracturing fluid including a surfactant system of this invention and pumping the gel or coacervate down a wellbore, in the presence or absence of a proppant and under pressure sufficient to fracture the formation. Proppants suitable for our invention include all the generally used or generally accepted proppant materials such as sand, shells, and other hard particulates. The fluid may be used in the absence of conventional brine-forming salts. Aqueous based gels used for formation fracturing and other well treatment usually employ guar, cellulose, or gums that depend on chemical bonding and are shear-sensitive.

Embodiments of the present invention relates to fracturing fluid compositions including a surfactant system of this invention, where the surfactant system includes from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems. The compositions ranges and effective amount of the composition are tailored to foam a fluid including a spectroscopically analyzed crude and/or condensate present in a producing formation.

Stimulating Fluids

Embodiments of the present invention relates to stimulating fluid compositions including a surfactant system of this invention, where the surfactant system includes from 0 wt. % to 100 wt. % of a first surfactant subsystem, from 100 wt. % to 0 wt. % of a second surfactant subsystem, and from 0 wt. % to 100 wt. % of a solvent subsystem based on the wt. % of the surfactant subsystems. The compositions ranges and effective amount of the composition are tailored to foam a fluid including a spectroscopically analyzed crude and/or condensate present in a producing formation.

Compositional Ranges

In certain embodiments, the composition includes a weight ratio of the first surfactant subsystem to the second surfactant subsystem is between about 10:1 and about 1:10. In other embodiments, the composition includes a weight of the first surfactant subsystem to the second surfactant subsystem is between about 4:1 and about 1:4. In other embodiments, the composition includes a weight of the first surfactant subsystem to the second surfactant subsystem is between about 7:3 and about 3:7. In other embodiments, the composition includes a weight of the first surfactant subsystem to the second surfactant subsystem is between about 3:2 and about 2:3. In other embodiments, the composition includes a weight of the first surfactant subsystem to the second surfactant subsystem is about 1:1. In other embodiments, the composition includes a weight ratio of the first surfactant subsystem to the second surfactant subsystem to solvent subsystem is about 10:1:1 and about 1:10:1 and about 10:1:10 and about 1:10:10. In other embodiments, the composition includes a weight ratio of the first surfactant subsystem to the second surfactant subsystem to solvent subsystem is about 4:1:1 and about 1:4:1 and about 4:1:4 and about 1:4:4. In other embodiments, the composition includes a weight ratio of the first surfactant subsystem to the second surfactant subsystem to solvent subsystem is about 7:3:1 and about 3:7:1 and about 7:3:3 and about 3:7:3 and 7:3:7 and about 3:7:7. In other embodiments, the composition includes a weight of the first surfactant subsystem to the second surfactant subsystem to solvent subsystem is between about 3:2:1 and about 2:3:1 and about 3:2:2 and about 2:3:2 and about 3:2:3 and about 2:3:3.

In other embodiments, the composition includes a weight of the first surfactant subsystem to the second surfactant subsystem to solvent subsystem is about 1:1:0.1 and about 1:1: 10.

For applications where the producing fluids include a condensate having little or no aromatics, the foaming systems of this invention includes one or a plurality of FFS surfactants in concentration between about 1 vol. % and 20 vol. %. In other embodiments, the concentration is between about 5 vol. % and about 15 vol. %. In other embodiments, the foaming systems for condensates having little or no aromatics include one or a plurality of FFS and a solvent subsystem of this invention in a ratio of between about 1:50 to about 1:1 at a concentration between about 5 vol. % and 20 vol. %. In other embodiments, the concentration is between about 10 vol. % and about 15 vol. %.

For applicants where the producing fluids include crudes or condensates having high aromatics, the foaming systems of this invention include one or a plurality of FSS surfactants at concentration between about 7.5 vol. % and about 20 vol. %. In other embodiments, the concentrations range between 10 vol. % and about 20 vol. %.

For application where the producing fluids include condensates and crudes that have aromatic and non aromatic character as determined by spectroscopic analysis of the fluids, the foaming system of this invention include a combination of FFS and FSS surfactants in the presence or absence of a solvent subsystem of this invention, where the surfactants are in a range between about 1 vol. % and about 40 vol. %.

Foaming Composition Ranges

The foaming agents of this invention are generally added to their respective fluids in a volume percent (vol. %) ranging between about 0.1 vol. % and about 30.0 vol. %. In certain embodiments, the foaming agents are added in a volume percent (vol. %) ranging between about 1 vol. % and about 30.0 vol. %. In other embodiments, the foaming agents are added in a volume percent (vol. %) ranging between about 2 vol. % and about 30 vol. %. In other embodiments, the foaming agents are added in a volume percent (vol. %) ranging between about 5 vol. % and about 30.0 vol. %.

Foam Properties

The foaming agents of this invention produce foams having the general properties of foam heights of at least 150 mL, half lives of greater than or equal to ($\geq$) about 2 minutes, capable of a clean break and a good foam texture. A foam that has a good foam texture is characterized by having a small average fine bubble size as opposed to coarse foam, which have a large average bubble size. In other embodiments, the foam heights are at least 160 mL and the half lives are greater than or equal to ($\geq$) about 3 minutes. In other embodiments, the foam heights are at least 170 mL and the half lives are greater than or equal to ($\geq$) about 3 minutes. In other embodiments, the foam heights are at least 180 mL and the half lives are greater than or equal to ($\geq$) about 3 minutes.

Suitable Reagents

Suitable fluorinated surfactants include, without limitation, any fluorinated surfactant capable of forming a stable foam with a condensate having little or no aromatic content. Exemplary examples of fluorinated surfactants having this property are fluoroaliphatic polymeric ester (FAPE) surfactants. In certain embodiments, the FAPE surfactants have an average molecular weight of at least 1000,000 grams per mole. In other embodiments, the fluoroaliphatic polymeric ester (FAPE) surfactants are FAPE surfactants described in WO 2008/089391 A1 and WO 2008/089386 A2 and available from 3-M Innovative Properties Company of Saint Paul Minn., USA.

Suitable silicone-base surfactants include, without limitation, any silicon surfactant capable of forming a stable foam with a condensate having a spectroscopically identifiable aromatic content and Red Diesel. Exemplary example of silicone surfactants having this property are DOW CORNING® SZ-1175, DOW CORNING® SZ-1180, DOW CORNING® SZ-1325E, DOW CORNING® SZ-1328E, DOW CORNING® SZ-1346E, DOW CORNING® 198 ADDITIVE, DOW CORNING® 5043 ADDITIVE, DOW CORNING® 5160 ADDITIVE, Sylgard® 309 (Wilbur-Ellis Company), Freeway® (Loveland Industries), Dyne-Amic® (Helena Chemical Company), and Silwet L-77® (Loveland and Helena), or mixtures or combinations.

Suitable solvents include, without limitation, a blend of biodegradable, non-toxic, non-hazardous solvent including biodegradable paraffins, olefins, naphthenes, esters, and oxygenates having a flashpoint$\geq$80° C. and pour points of about 19° F. Exemplary examples include terpenes and mixture of terpenes derived from citrus plants including HF 1000™, d-limonenes, orange terpenes, lemon terpenes, grapefruit terpenes, orange oil, lemon oil, other citrus terpenes, other citrus oils, or mixtures and combinations thereof.

Suitable Drilling Fluid Components

Suitable hydrocarbon base fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5\times10^{-6}$ to about $600\times10^{-6}$ m$^2$/s (5 to about 600 centistokes). Exemplary examples of such hydrocarbon fluids include, without limitation, polyalphaolefins, polybutenes, polyolesters, vegetable oils, animal oils, other essential oil, diesel having a low or high sulfur content, kerosene, jet-fuel, internal olefins (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Limpar, Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include bends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythritols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5\times10^{-6}$ to about $600\times10^{-6}$ m$^2$/s (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet.

Exemplary examples of vegetable oils include, without limitation, castor oils, corn oil, olive oil, sunflower oil, sesame oil, peanut oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Suitable foaming agents for use in this invention include, without limitation, any foaming agent suitable for foaming hydrocarbon based drilling fluids. Exemplary examples of foaming agents include, without limitation, silicone foaming agents such as tetra(trimethylsiloxy)silane, fluorinated oligomeric or polymeric foams such as fluorinated methacrylic copolymer, or other similar foaming agents capable of producing a foam in a hydrocarbon or oil-based drilling fluid or mixtures or combinations thereof. Exemplary examples of such foaming agents include, without limitation, DC-1250 available from Dow Corning, Zonyl FSG available from DuPont, APFS-16 available from Applied Polymer, A4851 available from Baker Petrolite, Superfoam available from Oilfield Solutions, Paratene HFA available from Woodrising, DVF-880 available from Parasol Chemicals INC., JBR200, JBR300, JBR400, and JBR500 available from Jeneil Biosurfactant Company, Paratene HFA, Paratene HFB, Paratene MFA, Paratene MFB available from Woodrising Resources Ltd. or mixture or combinations.

Suitable polymers for use in this invention include, without limitation, any polymer soluble in the hydrocarbon base fluid. Exemplary polymers include, without limitation, a polymer comprising units of one or more (one, two, three, four, five, . . . , as many as desired) polymerizable mono-olefins or di-olefins. Exemplary examples includes, without limitation, polyethylene, polypropylene, polybutylene, or other poly-alpha-olefins, polystyrene or other polyaromatic olefins, polybutadiene, polyisoprene, or other poly-diolefins, or copolymers (a polymer including two or more mono-olefins or di-olefins) or copolymers including minor amount of other co-polymerizable monomers such as acrylates (acrylic acid, methyl acrylate, ethyl acrylate, etc.), methacrylates (methacrylic acid, methyl methacrylate, ethyl methacrylate, etc), vinylacetate, maleic anhydride, succinic anhydride, or the like, provided of course that the resulting polymer is soluble in the hydrocarbon base fluid.

Suitable gelling agents for use in this invention include, without limitation, any gelling agent. Exemplary gelling agents includes phosphate esters, ethylene-acrylic acid copolymer, ethylene-methacrylic acid copolymers, ethylene-vinyl acetate copolymers, ethylene-maleic anhydride copolymers, butadiene-methacrylic acid copolymers, ethylene-methacrylic acid copolymers, styrene-butadiene-acrylic acid copolymers, styrene-butadiene-methacrylic acid copolymers, or other copolymer including monomers having acid moieties or mixtures or combinations thereof. Exemplary examples phosphate ester gelling agents include, without limitation, WEC HGA 37, WEC HGA 70, WEC HGA 71, WEC HGA 72, WEC HGA 702 or mixtures or combinations thereof, available from Weatherford International. Other suitable gelling agents include, without limitation, Geltone II available from Baroid, Ken-Gel available from Imco or the like.

Suitable cross-linking agent for use in this invention include, without limitation, any suitable cross-linking agent for use with the gelling agents. Exemplary cross-linking agents include, without limitation, di- and tri-valent metal salts such as calcium salts, magnesium salts, barium salts, copperous salts, cupric salts, ferric salts, aluminum salts, or mixtures or combinations thereof. Exemplary examples cross-linking agent for use with phosphate esters include, without limitation, WEC HGA 44, WEC HGA 48, WEC HGA 55se, WEC HGA 55s, WEC HGA 61, WEC HGA 65 or mixtures or combinations thereof available from Weatherford International.

Suitable defoaming agents for use in this invention include, without limitation, any defoaming agent capable of reducing the foam height of the foamed drilling fluid systems of this invention. Exemplary examples of defoaming agents are low molecular weight alcohols with isopropanol or isopropyl alcohol (IPA) being preferred.

Gases

Suitable gases for foaming the foamable, ionically coupled gel composition include, without limitation, nitrogen, carbon dioxide, or any other gas suitable for use in formation fracturing, or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: $C_1$ to $C_8$ monocarboxylic acids such as formic acid, acetic acid, propanoic acid, butanoic acid, pentanoic acid, hexanoic acid, heptanoic acid, octanoic acid, 2-ethylhexanoic acid, or the like; $C_2$ to $C_{12}$ dicarboxylic acids, $C_2$ to $C_{12}$ unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., $Na^+$, $K^+$ or $NH_4^+$ salts of EDTA; $Na^+$, $K^+$ or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus—Nitrilotriacetamide available from Clearwater International, LLC of Houston, Tex.

Defoamers

Suitable defoaming agents for use in this invention include, without limitation, any defoaming agent capable of reducing the foam height of the foamed drilling fluid systems of this invention. Exemplary examples of defoaming agents are Dow Corning Antifoamers such as Dow Corning 200®.

Foam Characteristics

Generally, the foamable hydrocarbon drilling fluid systems of this invention from an initial fluid amount of 100 mL, will produce a foam having a foam height of at least 150 mL and a half life of at least 2 minutes. In particular, the produced foam will have a foam height between about least 150 mL and about 500 mL and a half life between about 2 minutes and 15 minutes depending on the application and the exact formulation of the hydrocarbon fluid of this invention. The stability or half life and foam height of the produced foam is controlled by the amount and type of the viscosifying agents in the composition, by the amount and type of the foaming agents in the composition, by the amount of gas and type of gas in the composition, by the temperature of the composition and by the pressure of the composition. Generally, increasing the amount of the viscosifying agents and/or foaming agents, the foam stability and height can be increased. Generally, the viscosifying agents increase the stability more than the foam height, while the foaming agents increase the foam height. Of course, the foam height is also directly proportional to the amount and type of gas dissolved or absorbed in the fluid.

EXPERIMENTS OF THE INVENTION

Foam Test

Foam test used a Laboratory Hamilton Beach Mixer. The mixing procedure was to mix the test drilling fluids at high speed for 45 seconds to 60 seconds and noting any change at 15 second intervals. Foaming concentration tested are as set forth herein. After foaming on the mixer, the test drilling fluids were poured into either a 1,000 mL of 500 mL graduated cylinder to determine if the foam measurement were linear. The foam height represented the mL occupied by the foam after the foam was poured into the cylinder. The half life represents the time it takes a foam having an initial foam volume to decay by 50% of that original foam volume, e.g., if the initial foam volume is 500 mL as measured in a 1000 mL graduated cylinder, then the half life is the time it takes for the foam volume to reduce to a value of 250 mL.

The surfactant systems of this invention have been demonstrated to offer desirable foam properties in condensates regardless of the degree of unsaturation or aromatics in the condensate makeup. In fact, it is now possible, based on an initial analysis of the condensate or crude oil makeup, to tailor a surfactant system of this invention to act as a green foam system of the condensate or crude oil of a given producing formation. As tabulated in Table 1, resultant foam properties obtained from blends of the FFS and FSS surfactants are superior to that of FFS or FSS independently.

TABLE 1

Evaluation of FFS and FSS Surfactants in Red Diesel

| Composition | Foam Height (mL) | Half-Life (min:sec) | Comment |
| --- | --- | --- | --- |
| FFS | 176 | 3:00 | Clean break |
| FFS[a] | 200 | 3:30 | Stable emulsion seen |
| 7FFS:3FSS | 160 | 3:00 | Excellent clean break |
| 3FFS:7FSS | 180 | 3:00 | Excellent foam texture/ Excellent clean break |
| 1FFS:1FSS | 168 | 3:00 | Excellent clean break |

The foaming system were added at a concentration of 1 vol. %.
FFS is a fluoroaliphatic polymeric ester surfactant available from 3M.
FSS is a silicon surfactant available from Weatherford under the tradename OleoFoam C ™.
[a]The FAPE is a solution containing 20 wt. % of fluoroaliphatic polymeric esters available from 3M.

A brief summary of the foaming properties of FFS and FSS surfactants to foam condensates having distinct properties are tabulated in Table 2.

TABLE 2

Evaluation of Fluoroaliphatic Polymeric Esters with Condensates

| Composition | Foam Height (mL) | Half-Life (min:sec) | Comment |
| --- | --- | --- | --- |
| FSS (≦10 vol. %) + Crude (36 API) | 180 | 5:0 | Highly compatible |
| FFS[a] (≦5 vol. %) + Crude (36 API) | 0 | 0 | Incompatible |
| FFS[a] (≦10 vol. %) + C-3[b] | 0 | 0 | Incompatible |
| FFS (15 vol. %) + C-3[b] | 170 | 0:40 | Unique property |
| FFS (1.0 vol. %) + 50 mL C-3[b] + 50 mL SS | 180 | 1:00 | Effect of diluent |
| FFS (2.0 vol. %) + 50 mL C-3[b] + 50 mL SS | 180 | 1:35 | Effect of diluent |
| FFS (10 vol. %) + C-2[c] | 280 | 2:40 | Unique property |
| FFS (15 vol. %) + C-2[c] | 300 | 3:00 | Unique property |

FFS is a fluoroaliphatic polymeric ester surfactant available from 3M.
FSS is a silicon surfactant available from Weatherford under the tradename OleoFoam C ™.
SS is a solvent system of this invention.
[a]The FAPE is a solution containing 20 wt. % of fluoroaliphatic polymeric esters available from 3M.
[b]C-3 is Condensate-3
[c]C-2 is Condensate-2

The surfactant systems of this invention are unique in their ability to be effective and efficient lift systems for crude oil, condensate, or mixtures thereof at various concentrations of water. Essentially, with the surfactant systems of this invention, various hydrocarbons such as neat local crude oil, condensates, internal olefins, synthetics, other hydrocarbons or mixtures and combinations thereof can now be foamed and used in drilling applications and mitigation applications to increase production of producing formations.

Hitherto, unloading wells containing condensates with surfactants has been an intractable task. Similarly, during drilling operations, condensate surges readily kill (defoam or break) foam drilling fluids. These disruptions in the foam characteristics of the drilling fluid due to the condensate surge may lead to failure or costly recovery of normal operating parameters. However, with careful planning, it is now possible to unload condensates from wells.

For the most part, condensate compositions are well dependent; therefore, characteristics of a condensate of interest are first established spectroscopically to obtain a characterization profile of the condensate or production fluids in general from a producing formation as it is being discovered or as it is being produced. Subsequently, the condensate is then matched with surfactant possessing desired characteristics that will produce a stable foam having an desired foam height and half life. The condensate characterization classifies the condensate as to its constituent makeup including aromatic content, non-aromatic content, aliphatic content, and/or naphthalic content using Fourier Transform Infra-Red (FTIR) spectroscopy or other spectroscopic methods that are capable of classifying condensate composition. The classification is the first step in a method to formulate a surfactant system of this invention that will afford a stable foam in a fluid containing the condensate. This step is sometimes referred to here as the diagnostic step.

Referring now to FIG. 1, overlapping FT-IR spectrum of aromatic and non-aromatic condensates relative to Red Diesel are shown. It is clear from the FT-IR spectra of condensate-1 (C-1), condensate-2 (C-2), condensate (C-3) and Red Diesel that the four materials share many similar IR profiles. In the classification, condensates with significant absorptions consistent with aromatics can be differentiated from condensate with little or no aromatics. C-1 and Red Diesel show absorptions at 1607 $cm^{-1}$ and a shoulder at about 1495 $cm^{-1}$ including ~1501 $cm^{-1}$ absorption characteristic of a $v_{C=C}$ ring stretch representatives of aromatic rings, while C-2 lacks such absorptions consistent with condensates that include little or no aromatics. C-3 has less aromatic character than C-1, but more than C-2.

FSS, a silicon surfactant system, produces a stable foam in C-1 as well as Red Diesel, while FFS, a FAPE surfactant system, produces a stable foam in C-2. In sum, FFS systems were found to be incompatible with non-aromatic condensates, while FSS systems were found to be compatible with aromatic condensates. Thus, it is possible to formulate a surfactant system that exhibits desirable foam properties for a given production fluid after the fluid has been characterized to produce a characteristic profile.

After a characteristic profile of a condensate or crude is available, a surfactant system of this invention may be formulated to produce a stable foam in a fluid such as a drilling fluid, a producing fluid, a lift fluid, a fracturing fluid and/or a stimulating fluid containing the condensate and/or crude. In certain embodiments, the surfactant system comprises a blend of FFS and FSS surfactants. In other embodiments, the surfactant system comprises a blend of FFS and FSS surfactants and a solvent system of this invention. In other embodiments, the surfactant system comprises one FFS surfactant or a plurality of FFS surfactants and a solvent system of this invention. As shown in Table 2, FFS surfactants do not produce stable foams in Condensate-1 (C-1) containing fluids, but stable foam were obtained when a solvent system of this invention was used as a diluent.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A surfactant composition comprising:
a first surfactant subsystem comprising a fluorinated surfactant including fluoroaliphatic polymeric ester (FAPE) surfactants,
a second surfactant subsystem comprising silicon surfactant, and
0 wt. % to 100 wt. % of a solvent subsystem based on the wt. % of the surfactant subsystems selected from the group consisting of terpenes and mixture of terpenes derived from citrus plants including a biodegradable blend of paraffins, olefins, naphthenes, esters, and oxygenates, d-limonenes, orange terpenes, lemon terpenes, grapefruit terpenes, orange oil, lemon oil, other citrus terpenes, other citrus oils, or mixtures and combinations thereof,
where a weight ratio of the first surfactant subsystem to the second surfactant subsystem is between about 10:1 and about 1:10 and where the composition tailored to foam a fluid including a spectroscopically analyzed crude and/or condensate present in a producing formation.

2. The composition of claim 1, wherein a weight of the first surfactant subsystem to the second surfactant subsystem is between about 4:1 and about 1:4.

3. The composition of claim 1, wherein a weight of the first surfactant subsystem to the second surfactant subsystem is between about 7:3 and about 3:7.

4. The composition of claim 1, wherein a weight of the first surfactant subsystem to the second surfactant subsystem is between about 3:2 and about 2:3.

5. The composition of claim 1, wherein a weight of the first surfactant subsystem to the second surfactant subsystem is about 1:1.

6. The composition of claim 1, wherein a weight ratio of the first surfactant subsystem to the second surfactant subsystem is between about 1:10 to 10:1, while a weight ratio of the solvent subsystem to the second surfactant subsystem is between 1 and 10.

7. The composition of claim 1, wherein a weight ratio of the first surfactant subsystem to the second surfactant subsystem is between about 1:4 to 4:1, while a weight ratio of the solvent subsystem to the second surfactant subsystem is between 1 and 4.

8. The composition of claim 1, wherein a weight ratio of the first surfactant subsystem to the second surfactant subsystem is between about 3:7 to 7:3, while a weight ratio of the solvent subsystem to the second surfactant subsystem is between 3 and 7.

9. The composition of claim 1, wherein a weight ratio of the first surfactant subsystem to the second surfactant subsystem is between about 2:3 to 3:2, while a weight ratio of the solvent subsystem to the second surfactant subsystem is between 2 and 3.

10. The composition of claim 1, wherein a weight ratio of the first surfactant subsystem to the second surfactant subsystem to solvent subsystem varies between about 1:1:0.1 and about 1:1:10.

11. A drilling fluid composition comprising a surfactant system including:
- a first surfactant subsystem comprising a fluorinated surfactant including fluoroaliphatic polymeric ester (FAPE) surfactants,
- a second surfactant subsystem comprising silicon surfactant, and
- 0 wt. % to 100 wt. % of a solvent subsystem based on the wt. % of the surfactant subsystems selected from the group consisting of terpenes and mixture of terpenes derived from citrus plants including a biodegradable blend of paraffins, olefins, naphthenes, esters, and oxygenates, d-limonenes, orange terpenes, lemon terpenes, grapefruit terpenes, orange oil, lemon oil, other citrus terpenes, other citrus oils, or mixtures and combinations thereof,
- where a weight ratio of the first surfactant subsystem to the second surfactant subsystem is between about 10:1 and about 1:10 and where the system is tailored to foam the drilling fluid composition including a spectroscopically analyzed crude and/or condensate present in a producing formation.

12. A completion fluid composition comprising a surfactant system including:
- a first surfactant subsystem comprising a fluorinated surfactant including fluoroaliphatic polymeric ester (FAPE) surfactants,
- a second surfactant subsystem comprising silicon surfactant, and
- 0 wt. % to 100 wt. % of a solvent subsystem based on the wt. % of the surfactant subsystems, selected from the group consisting of terpenes and mixture of terpenes derived from citrus plants including a biodegradable blend of paraffins, olefins, naphthenes, esters, and oxygenates, d-limonenes, orange terpenes, lemon terpenes, grapefruit terpenes, orange oil, lemon oil, other citrus terpenes, other citrus oils, or mixtures and combinations thereof
- where a weight ratio of the first surfactant subsystem to the second surfactant subsystem is between about 10:1 and about 1:10 and where the system is tailored to foam the completion fluid composition including a spectroscopically analyzed crude and/or condensate present in a producing formation.

13. A fracturing fluid composition comprising a surfactant system including:
- a first surfactant subsystem comprising a fluorinated surfactant including fluoroaliphatic polymeric ester (FAPE) surfactants,
- a second surfactant subsystem comprising silicon surfactant, and
- 0 wt. % to 100 wt. % of a solvent subsystem based on the wt. % of the surfactant subsystems selected from the group consisting of terpenes mixture of terpenes derived from citrus plants including a biodegradable blend of paraffins, olefins, naphthenes, esters, and oxygenates, d-limonenes, orange terpenes, lemon terpenes, grapefruit terpenes, orange oil, lemon oil, other citrus terpenes, other citrus oils, or mixtures and combinations thereof,
- where a weight ratio of the first surfactant subsystem to the second surfactant subsystem is between about 10:1 and about 1:10 and where the system is tailored to foam the fracturing fluid composition including a spectroscopically analyzed crude and/or condensate present in a producing formation.

14. A stimulating fluid composition comprising a surfactant system including:
- a first surfactant subsystem comprising a fluorinated surfactant including fluoroaliphatic polymeric ester (PAPE) surfactants,
- a second surfactant subsystem comprising silicon surfactant, and
- 0 wt. % to 100 wt. % of a solvent subsystem based on the wt. % of the surfactant subsystems selected from the group consisting of terpenes and mixture of terpenes derived from citrus plants including a biodegradable blend of paraffins, olefins, naphthenes, esters, and oxygenates, d-limonenes, orange terpenes, lemon terpenes, grapefruit terpenes, orange oil, lemon oil, other citrus terpenes, other citrus oils, or mixtures and combinations thereof,
- where a weight ratio of the first surfactant subsystem to the second surfactant subsystem is between about 10:1 and about 1:10 and where the system is tailored to foam the stimulating fluid composition including a spectroscopically analyzed crude and/or condensate present in a producing formation.

* * * * *